No. 110,180.  L. WILLIAMS. MOP HEAD.  PATENTED DEC. 13, 1870.

Witnesses
Jno. A. Ellis.
E. Alexander

Inventor
Lewis Williams.
Per
F. H. Alexander
Atty.

UNITED STATES PATENT OFFICE.

LEWIS WILLIAMS, OF ARLINGTON, VERMONT.

IMPROVEMENT IN MOP-HEADS.

Specification forming part of Letters Patent No. 110,180, dated December 13, 1870.

*To all whom it may concern:*

Be it known that I, LEWIS WILLIAMS, of Arlington, in the county of Bennington and State of Vermont, have invented certain new and useful Improvements in Mop-Heads; and I do hereby declare that the following is a full, clear, and exact description thereof, reference being had to the accompanying drawing, and to the letters of reference marked thereon, which form a part of this specification, in which—

Figure 1:
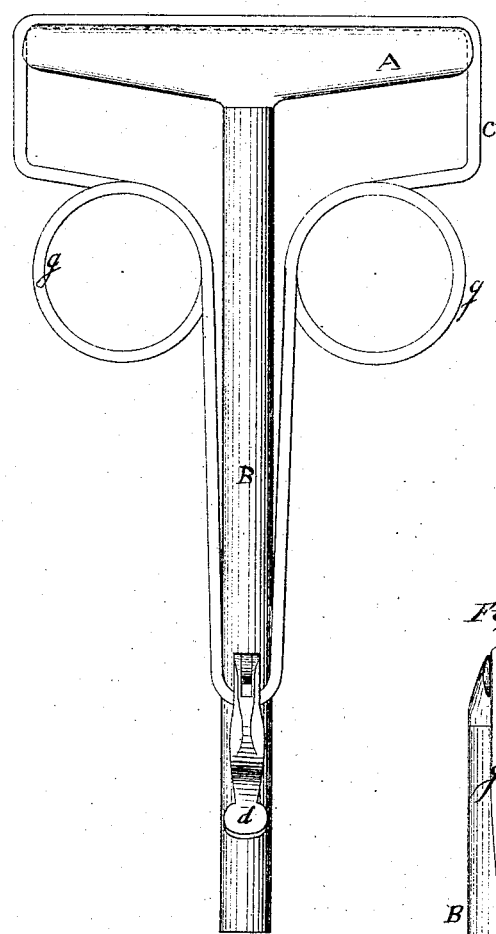
Figure 3:
Figure 2:

Figure 1 is a plan view of my mop. Fig. 2 is a vertical section of the lever and part of the handle. Fig. 3 is a side view of spring and bail.

In the annexed drawings, A represents the mop-head, and B the handle. C is the bail, consisting of a metal rod, of suitable size, the part extending the length of head A and resting in a groove made to receive it. Grooves are also made at each end of the head A, and the bail bent at right angles, so as to rest in said grooves. At a suitable distance from the mop-head the two ends of bail C are bent inward, and then in the form of a circle, $g$. The ends of the bail will extend toward the upper end of the handle as far as required, and there soldered together. The upper end of the bail will have a semicircular form, and its two sides sufficiently far apart to embrace the lever $d$, which is slotted at its lower end and pivoted to a metal plate, $e$, the said plate being let into the handle B directly inside of the curve in bail C. The under side and lower end of lever $d$ is curved slightly, and at the upper end of said curve a circular indentation is made of sufficient size to grasp the bail C.

In operating my mop-head the lever $d$ will be pushed back, so as to admit the bail's being removed sufficiently far from the head A to receive the mop. The lever $d$ will then be pressed down until it rests on the handle B. By this operation the mop will be confined to its place.

One of the advantages in the construction of my mop-head is the circles $g$ in the bail, the said circles answering the purpose of springs, which will regulate the pressure of the bail on the mop in event of sudden resistance.

Having thus described my invention, what I claim, and desire to secure by Letters Patent, is—

1. The bail C, each side thereof being formed with a circular spring, $g$, substantially as set forth.

2. In combination with the above, the lever $d$, when constructed and operated substantially as specified.

In testimony that I claim the foregoing as my own I affix my signature in presence of two witnesses.

LEWIS WILLIAMS.

Witnesses:
N. R. DOUGLASS,
F. B. EDDY.